United States Patent [19]

Babitzka

[11] Patent Number: 4,709,673
[45] Date of Patent: Dec. 1, 1987

[54] FUEL INJECTION APPARATUS FOR INTERNAL COMBUSTION ENGINES

[75] Inventor: Rudolf Babitzka, Kirchberg, Fed. Rep. of Germany

[73] Assignee: Robert Bosch GmbH, Stuttgart, Fed. Rep. of Germany

[21] Appl. No.: 763,595

[22] Filed: Aug. 8, 1985

[30] Foreign Application Priority Data

Oct. 17, 1984 [DE] Fed. Rep. of Germany ....... 3437933

[51] Int. Cl.$^4$ .............................................. F02M 41/14
[52] U.S. Cl. .................................... 123/299; 123/450; 417/462
[58] Field of Search ............... 123/300, 299, 450, 458; 417/462

[56] References Cited

U.S. PATENT DOCUMENTS

| | | | |
|---|---|---|---|
| 4,497,298 | 2/1985 | Ament | 123/450 |
| 4,522,174 | 6/1985 | Babitzka et al. | 123/300 |
| 4,530,324 | 7/1985 | Tanaka et al. | 123/300 |
| 4,531,488 | 7/1985 | Kawamura et al. | 123/300 |
| 4,564,341 | 1/1986 | Tanaka | 123/300 |

FOREIGN PATENT DOCUMENTS

| | | | |
|---|---|---|---|
| 59-155567 | 9/1984 | Japan | 123/450 |
| 2033959 | 5/1980 | United Kingdom | 123/450 |

Primary Examiner—Andrew M. Dolinar
Attorney, Agent, or Firm—Edwin E. Greigg

[57] ABSTRACT

A fuel injection apparatus comprising a radial piston distributor pump is described, which has first pump pistons in a first radial plane and second pump pistons in a second radial plane the pump pistons being diametrically opposite one another and those of the first radial plane being offset in the rotational direction from those of the second radial plane, and the pump pistons of both radial planes being driven by a common cam ring. The fuel positively displaced by the pump pistons is delivered via a common pressure line to a first distributor opening and a second distributor opening, which are disposed spaced apart by 135° from one another on the jacket face of the distributor of the radial piston pump and which supply fuel injection lines with a pre-injection quantity and a main injection quantity of fuel.

11 Claims, 4 Drawing Figures

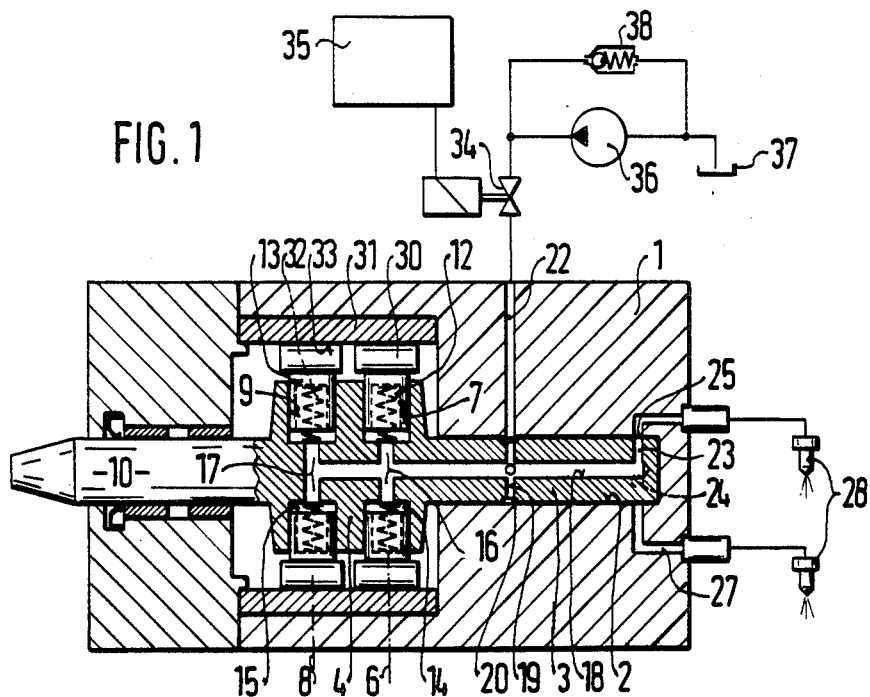
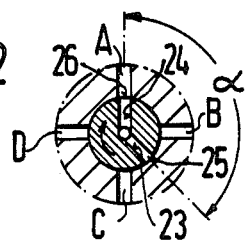
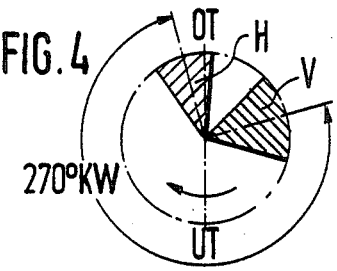
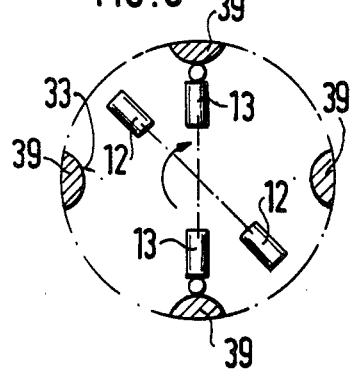

FUEL INJECTION APPARATUS FOR INTERNAL COMBUSTION ENGINES

BACKGROUND OF THE INVENTION

The invention is based on a fuel injection apparatus for internal combustion engines as defined hereinafter. In a fuel injection apparatus of this kind, known from U.S. Pat. No. 4,522,174 issued Jun. 11, 1985, the two pump work chambers are completely separate from one another and each one of them is connected in alternation, via a pressure line and a control valve, either with the fuel metering device during the intake stroke or with the distributor during the pumping stroke, and at the same time the other pump work chamber is connected with a relief chamber via the control valve and a pressure line. This apparatus is very expensive, especially because of the control valve used in it.

OBJECT AND SUMMARY OF THE INVENTION

The fuel injection apparatus according to the invention has the advantage over ther prior art that it is substantially simpler in design and uses a fast-switching metering device, so that an exact pre-injection and main injection of fuel, defined by the construction of the angular relationship, can be attained. By means of the cam embodiment, the supply rate of the individual partial injections can be defined differently from one another and thereby optimized.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 1 shows a radial-piston fuel distributor injection pump in simplified form;

FIG. 2 is a section taken through the distributor of the fuel injection pump of FIG. 1;

FIG. 3 shows the pump piston pairs of the fuel injection pump of FIG. 1; and

FIG. 4 is a diagram showing the injection ranges which can be adhered to during one cycle of the internal combustion engine, using the fuel injection pump described herein.

DESCRIPTION OF THE PREFERRED EMBODIMENT

In the radial-piston distributor injection pump shown in FIG. 1, a distributor cylinder 2 is provided in a housing 1 and a distributor 3 is rotatably supported therein. On the end 4 of the distributor protruding from the distributor cylinder, the distributor has an enlarged diameter, which in a first radial plane 6 receives two diametrically opposed, radially extending, first pump cylinders 7. In a second radial plane 8 parallel to the first radial plane 6, a further two diametrically opposed, radially extended, second pump cylinders 9 are disposed in the end 4 of the distributor having the enlarged diameter. This end of the distributor is also coupled or positively connected to a pump drive shaft 10.

First pump pistons 12 are displaceably supported in each of the first pump cylinders 7, and second pump pistons 13 are displaceably supported in each of the second pump cylinders 9. At their ends, within the pump cylinders, the pump pistons enclose first pump work chambers 14 and second pump work chambers 15, respectively, which communicate with one another by means of respective transverse conduits 16 and 17 in the distributor. The two transverse conduits are in continuous communication with one another via a pressure line 18 which extends axially in the distributor. The pressure line 18 leads axially from the second transverse conduit 17 to the first transverse conduit 16 and further into the part of the distributor located in the distributor cylinder, where it terminates in the form of a blind bore. Radial conduits 19 branch off from the pressure line 18, preferably corresponding in number and distribution to the intake strokes of the pump pistons per revolution of the distributor. The radial conduits 19 discharge into an annular groove 20 disposed on the jacket face of the distributor, which groove communicates with a fuel supply line discharging into the distributor cylinder 2. Also branching off from the pressure line 18 are two radial conduits 23 and 24 offset from one another by an angle $\alpha$ of 135°, which discharge into a first distributor opening 25 and a second distributor opening 26 on the jacket face of the distributor. In the radial plane in which these distributor openings are located, injection lines 27 lead away from the distributor, on the circumference of which they are distributed, corresponding in number and distribution to the cylinders of the associated internal combustion engine that are to be supplied with fuel. The injection lines lead from the pump housing out to symbolically shown fuel injection valves 28. In the illustrated example, the fuel injection pump supplies a four-cylinder, four-stroke engine; hence four injection lines A–D, which are at 90° intervals from each other, must be supplied with fuel per revolution of the distributor. This situation is illustrated in FIG. 2.

The pump pistons are driven via rollers 30, which are carried by roller tappets and roll off on one or two cam tracks of a cam ring 31 radially surrounding the pump pistons. The pump pistons and the rollers 30 are held in contact with the cam track 33 by means of compression springs 32. These compression springs are fastened between the pump pistons and the inner end face of the pump cylinder.

A valve 34 with which the fuel quantity that attains injection can be controlled is disposed in the fuel supply line 22. This valve is controlled by a control unit 35, and it can be triggered either directly, as an electromechanical valve, or as a servo valve. Preferably, for the sake of rapid and accurate switching, it can be embodied in the same manner as that disclosed in the above-discussed prior art. Depending on what is needed, however, a piezo valve of a different embodiment of an electromagnetic valve can also be used.

The fuel supply line is supplied with fuel from a fuel supply container 37 via a fuel feed pump 36, and the supply pressure is adjustable with the aid of a pressure control valve 38.

For the sake of understanding what is shown in FIG. 1, it should be noted that the pump pistons in the second radial plane are shown offset by 45° from their actual position. The position of the pump pistons of the first radial plane and of the second radial plane is shown in FIG. 2. This drawing figure shows that the actuation of the first pump pistons 12 takes place 135° prior to the actuation of the second pump pistons 13. This corresponds to the location of the first distributor opening 25, which is in advance of the second distributor 26 by 135°, as shown in FIG. 2. The prerequisite here is that the width of the cam track 33 is designed such that it extends over the rollers 30 of the pump pistons of both radial planes.

If the pump drive shaft 10 is set into rotation, the rollers 30 are guided over the cam track 33 and the pump pistons are set into reciprocating motion. During a movement of the pump pistons outward, the fuel supply line 22 is made to communicate with one of the radial conduits 19, so that in accordance with the triggering of the valve 34 fuel can reach the pump work chamber 14. For pumping fuel, the pump piston is then moved inward by corresponding cam elevations on the cam track. The communication with the fuel supply line 22, or at least the opening of the fuel supply line 22, is then closed, so that the fuel positively displaced by the first radial piston 12 can be pumped via one of the distributor openings into one of the injection lines which is triggered in turn, and can emerge at injection pressure at the fuel injection nozzle. In the ensuing intake stroke of the first pump pistons, fuel is once again aspirated and made available for the next pumping operation.

By means of the embodiment of the injection pump, two pump piston pairs are now provided, in different radial planes, and are offset from one another, so that in a fuel injecting pump intended for supplying four cylinders, a total of eight pumping strokes per revolution can be executed with a cam track that is designed for pumping four times per revolution. Taking FIG. 2 as an example and assuming that the fuel pumping into the injection line A has been terminated by the second distributor opening 26, a pre-injection of fuel into the injection line C is effected after a clockwise rotation of 45° of camshaft angle, via the first distributor opening 25. This fuel quantity is pumped with the aid of the first pump pistons 13 as shown in FIG. 3. After a further rotation of 45°, a main injection quantity is pumped into the fuel injection line B via the second distributor opening 26, and this quantity is positively displaced by the second pump pistons 13. After a further rotation of 90°, the second distributor opening 26 coincides with injection line C, so that the main injection takes place there with the aid of the second pump pistons C, once again 135° after the preinjection via the first distributor opening 25. All the other injection lines are likewise supplied with fuel in the same fashion. In FIG. 3, for the sake of better comprehension of the invention, the location of the cams 39 on the cam track 33 is shown with respect to the location of the pump pistons. In FIG. 4, finally, one cycle of a piston of an internal combustion engine is shown, with an intake stroke and a compression stroke, and from this drawing it is apparent that the pre-injection V is located at 270° of crankshaft angle prior to the main injection H, and thus the pre-injection takes place at the onset of the intake stroke, while the main injection is located shortly before top dead center, at the end of the compression stroke.

Especially in a Diesel engine, this main injection serves to ignite the charge in the combustion chamber of the engine. The main injection thus determines the instant of ignition and must take place at the correct instant, in terms of combustion, with respect to top dead center of the pump piston. In the fuel injection pump according to the invention, the main injection quantity must be exactly large enough that ignition can occur, yet the pre-injection quantity must be provided such that up to the instant of the main injection, self-ignition of the compressed fuel-air mixture cannot occur. By taking these peripheral factors into account, a substantial fuel injection quantity can already be well mixed with the air charge in the combustion chambers during the intake phase and during the ensuing compression phase and thus prepared in such a way as to promote good combustion. The same aspects are also applicable to an internal combustion with externally supplied ignition which operates with direct injection into the combustion chamber, thereby avoiding intake choke regulation of aspirated mixture quantities, which is particularly disadvantageous during parital-load operation. In such engines, conditions are similar to that in a Diesel engine. The pre-injection according to the invention lessens the tendency to soot formation caused by incomplete fuel combustion, raises the rpm limit at which an engine can be operated, and increases the power produced while adhering to permissible emissions limits. A smooth course of combustion with little noise is attainable as well.

With the aid of a fast-switching valve 34, the fuel quantities attaining injection can be controlled accurately, and both the fuel metering quantity during the intake stroke and the effective duration of supply can be controlled with such a valve. In the latter case, the valve remains open during the intake stroke of the pump pistons, so that the pump work chamber can be fully filled with fuel. During the ensuing pumping stroke of the pump piston, the closure of the valve determines the supply onset, and the reopening of the valve determines the end of supply. In this manner, the pumping can take place at a selected portion of the cam elevation curve, and the injection can be controlled both after the supply onset and even after the end of supply. In the fuel injection apparatus described above, a single valve is sufficient for controlling fuel injection by means of both the first pump pistons 12 and the second pump pistons 13.

The foregoing relates to a preferred exemplary embodiment of the invention, it being understood that other variants and embodiment thereof are possible within the spirit and scope of the invention, the latter being defined by the appended claims.

What is claimed and desired to be secured by Letters Patent of the United States is:

1. A fuel injection apparatus for internal combustion engines having a rotationally driven distributor supported in a distributor cylinder, at least one pump piston operative in a first pump cylinder arranged to enclose a first pump work chamber in said driven distributor and at least one second pump piston operative in a second pump cylinder arranged to enclose a second pump work chamber in said driven distributor, said first pump cylinder being located in a first radial plane and said second pump cylinder being located in a second radial plane with said pump cylinders angularly offset with respect to teach other, said distributor further having a first distributor opening and a second distributor opening positioned angularly relative to each other, said distributor openings adapted during the course of distributor rotation to coincide successively with injection lines which extend from said distributor cylinder to injection locations of said engine, said openings further arranged to communicate via pressure lines (23, 24) in said distributor with one end of an axially extending distributor line 18 which communicates with said first pump work chamber (14) and said second work chamber (15) at its other end, each of said pump work chambers being connectable in succession via said one distributor line 18 and a common intake line in said distributor with a fuel supply line 22 provided with a metering device (34) in said fuel supply line, a cam ring (31) with radially arranged cams (39) that extend longitudinally of said cam ring in proximity to said at least one first and second pump pistons of said first and second pump cylinders, a pump drive mechanism 10 for rotation of said distributor and to generate in synchronism thereto a reciprocating movement of said pump pistons relative to said cam ring, and said pump pistons (12, 13) are positioned angularly relative to each other such that the angular interval of the distributor openings (24, 26) are such that said first pump piston (12) is actuated by the associated cams (39) by this angular interval offset from the actuation of said second pump piston (13).

2. A fuel injection apparatus as defined by claim 1, further wherein an angular interval ($\alpha$) is selected such that during a supply stroke of one of said pump pistons, the other of said pump pistons is located in its outermost radial position defined by a cam track of said cam ring, and one of said distributor openings is closed by said distributor cylinder.

3. A fuel injection apparatus as defined by claim 2, further wherein four injection lines lead away from said distributor cylinder at identical angular intervals and said angular interval ($\alpha$) of said distributor openings is 135° from one another.

4. A fuel injection apparatus as defined by claim 1, further wherein said metering valve is at least indirectly electrically controlled by an electrical control unit.

5. A fuel injection apparatus as defined by claim 2, further wherein said metering valve is at least indirectly electrically controlled by an electrical control unit.

6. A fuel injection apparatus as defined by claim 3, further wherein said metering valve is at least indirectly electrically controlled by an electrical control unit.

7. A fuel injection apparatus as defined by claim 1, further wherein a control unit is adapted to open said fuel supply line during an intake stroke of each of said pump pistons as well as close said fuel supply line upon the beginning of an effective pumping stroke, and thereafter reopen said fuel supply line in order to terminate said effective pumping stroke.

8. A fuel injection apparatus as defined by claim 2, further wherein a control unit is adapted to open said fuel supply line during an intake stroke of each of said pump pistons as well as close said fuel supply line upon the beginning of an effective pumping stroke, and thereafter reopen said fuel supply line in order to terminate said effective pumping stroke.

9. A fuel injection apparatus as defined by claim 3, further wherein a control unit is adapted to open said fuel supply line during an intake stroke of each of said pump pistons as well as close said fuel supply line upon the beginning of an effective pumping stroke, and thereafter reopen said fuel supply line in order to terminate said effective pumping stroke.

10. A fuel injection apparatus as defined by claim 4, further wherein a control unit is adapted to open said fuel supply line during an intake stroke of each of said pump pistons as well as close said fuel supply line upon the beginning of an effective pumping stroke, and thereafter reopen said fuel supply line in order to terminate said effective pumping stroke.

11. A fuel injection apparatus as defined by claim 1 wherein said metering device is separated from said fuel injection apparatus and controls beginning and end of injection.

* * * * *